US011400802B2

(12) United States Patent
Delaney et al.

(10) Patent No.: US 11,400,802 B2
(45) Date of Patent: Aug. 2, 2022

(54) CARGO SECURING DEVICE, TONNEAU COVER SYSTEM, AND METHOD OF USE

(71) Applicant: Tectum Holdings, Inc., Ann Arbor, MI (US)

(72) Inventors: Daniel John Delaney, Pinckney, MI (US); Jerome James Facchinello, Grand Blanc, MI (US)

(73) Assignee: Tectum Holdings, Inc., Ann Arbor, MI (US)

( * ) Notice: Subject to any disclaimer, the term of this patent is extended or adjusted under 35 U.S.C. 154(b) by 0 days.

(21) Appl. No.: 17/082,205

(22) Filed: Oct. 28, 2020

(65) Prior Publication Data

US 2022/0126659 A1 Apr. 28, 2022

(51) Int. Cl.
  *B60J 7/14* (2006.01)
  *B60J 7/02* (2006.01)
  *B60P 7/02* (2006.01)

(52) U.S. Cl.
  CPC ........... *B60J 7/141* (2013.01); *B60P 7/02* (2013.01)

(58) Field of Classification Search
  CPC . B60J 7/041; B60J 7/141; B60J 7/1607; B60J 7/20; B60P 7/02
  USPC .................. 296/100.02, 100.06, 100.09
  See application file for complete search history.

(56) References Cited

U.S. PATENT DOCUMENTS

| 4,795,206 | A | * | 1/1989 | Adams | ............... B60J 5/14 160/201 |
|---|---|---|---|---|---|
| 5,328,310 | A | | 7/1994 | Lockney | |
| 5,452,973 | A | | 9/1995 | Arvin | |
| 5,480,206 | A | | 1/1996 | Hathaway et al. | |
| 5,584,521 | A | | 12/1996 | Hathaway et al. | |
| 5,772,370 | A | | 6/1998 | Moore | |
| 6,257,637 | B1 | | 7/2001 | Reed | |
| 6,334,562 | B1 | | 1/2002 | Ament et al. | |
| 6,345,944 | B1 | | 2/2002 | Florence | |
| 6,406,183 | B1 | * | 6/2002 | Bober | ............... B60J 7/20 190/902 |
| 6,676,182 | B2 | | 1/2004 | Fitts | |

(Continued)

FOREIGN PATENT DOCUMENTS

| DE | 10118680 B | 8/2002 |
|---|---|---|
| DE | 102005031070 B4 | 1/2007 |

(Continued)

OTHER PUBLICATIONS

Chevy Avalanche Fan Club; Feb. 18, 2020; located at https://www.chevyavalanchefanclub.com/cafcna/index.php?threads/can-someone-help-with-using-the-cargo-panel-strap. 154447/. (Year: 2020).*

*Primary Examiner* — Jason S Daniels
(74) *Attorney, Agent, or Firm* — The Dobrusin Law Firm, P.C.

(57) ABSTRACT

A cargo securing device, a tonneau cover system comprising the cargo securing device, and a method of using the cargo securing device. The tonneau cover system includes a tonneau cover assembly having a tonneau cover and opposing frame rails supporting the tonneau cover on a cargo area of a vehicle. The cargo securing device includes a sleeve and an opening that provides access into the sleeve. The sleeve receives one or more panels of the tonneau cover so that the sleeve surrounds at least a portion of the one or more panels. The cargo securing device can be employed to secure cargo within the cargo area.

18 Claims, 6 Drawing Sheets

(56) References Cited

U.S. PATENT DOCUMENTS

| | | | |
|---|---|---|---|
| 6,722,542 B2 | 4/2004 | McMurray et al. | |
| 8,550,757 B2 | 10/2013 | Anderson et al. | |
| 8,998,547 B2 | 4/2015 | Ferriggi, Jr. | |
| 9,061,572 B2 | 6/2015 | Potter | |
| 2009/0236870 A1* | 9/2009 | Duncan | B60J 7/141 296/136.04 |
| 2013/0121785 A1 | 6/2013 | Coury et al. | |
| 2017/0088058 A1 | 3/2017 | Krishnan | |
| 2019/0351748 A1* | 11/2019 | Ford | B60R 5/04 |
| 2020/0353803 A1* | 11/2020 | Pompili | B60J 7/0573 |

FOREIGN PATENT DOCUMENTS

| | | |
|---|---|---|
| DE | 102016108366 A1 | 11/2016 |
| EP | 1153795 B1 | 8/2005 |
| WO | 2020/076666 A1 | 4/2020 |

\* cited by examiner

CARGO SECURING DEVICE, TONNEAU COVER SYSTEM, AND METHOD OF USE

FIELD

The present teachings generally relate to a cargo securing device, a tonneau cover system, and a method of using the cargo securing device. The cargo securing device may be particularly advantageous in securing cargo within a cargo area of a vehicle.

BACKGROUND

Cargo areas included in vehicles are routinely used to store and transport cargo. Cargo areas are limited by size, which varies between makes and models of vehicles. It is sometimes necessary to transport cargo that is oversized with respect to the size of a particular cargo area. For example, lumber is commonly sold in lengths that exceed the length of many commercially available vehicles. As a result, oversized cargo often protrudes outside of the confines of the cargo area. This may be a dangerous condition as the risk of the cargo falling out of the cargo area while the vehicle is operation is increased. Securing oversized cargo is possible although conventional vehicles provide limited solutions. Anchors located within the cargo area and on top of the sidewalls may accept tie-down ropes that wrap around the cargo, but these anchors are not always provided in locations that provide the most security. In addition, it is not always convenient to utilize these anchors because they may be difficult to access from outside the cargo area and access to anchors located within the cargo area may be impeded by cargo.

Tonneau covers are employed to cover cargo areas and protect the cargo stored therein. Tonneau covers may fully enclose a cargo area or they may be manipulated, by folding or rolling, to cover a portion of the cargo area. Tonneau covers include latches on the portions that fold or roll in order to secure said portions. In the case that oversized cargo is stored and transported in the cargo area, the latches are prevented from securing the tonneau cover to frame rails. The tonneau cover may be partially open and rest against the oversized cargo, however due to the lack of secure attachment, the tonneau cover may fall into a folded position during normal driving conditions, which may cause damage.

It would be desirable to provide a device for securing cargo that protrudes outside of a cargo area. It would be desirable to provide a device that provides attachment points that are accessible from outside the cargo area. It would be desirable to provide a cargo securing device that can be used with a tonneau cover. It would be desirable to provide a cargo securing device that prevents the tonneau cover from moving while also securing cargo.

SUMMARY

The present disclosure relates to a cargo securing device, which may address at least some of the needs identified above, the cargo securing device comprising: a sleeve including an opening; wherein the sleeve is configured to receive one or more panels of a tonneau cover so that the sleeve surrounds at least a portion of the one or more panels.

The present disclosure relates to a tonneau cover system, which may address at least some of the needs identified above, the tonneau cover system comprising: a tonneau cover assembly including a tonneau cover comprising one or more panels and opposing frame rails supporting the tonneau cover on a cargo area of a vehicle; and a cargo securing device including a sleeve including an opening; wherein the sleeve is configured to receive one or more panels of a tonneau cover so that the sleeve surrounds at least a portion of the one or more panels.

The present disclosure relates to method of using a cargo securing device, which may address at least some of the needs identified above, the method comprising: locating a cargo securing device onto one or more panels of a tonneau cover, the cargo securing device including one or more retaining members; and placing the one or more retaining members into engagement with one or more frame rails, the one or more frame rails being installed on a vehicle; wherein the cargo securing device includes a sleeve, which surrounds at least a portion of the one or more panels, and an opening through which the one or more panels enter the sleeve.

DETAILED DESCRIPTION

Figure 1:
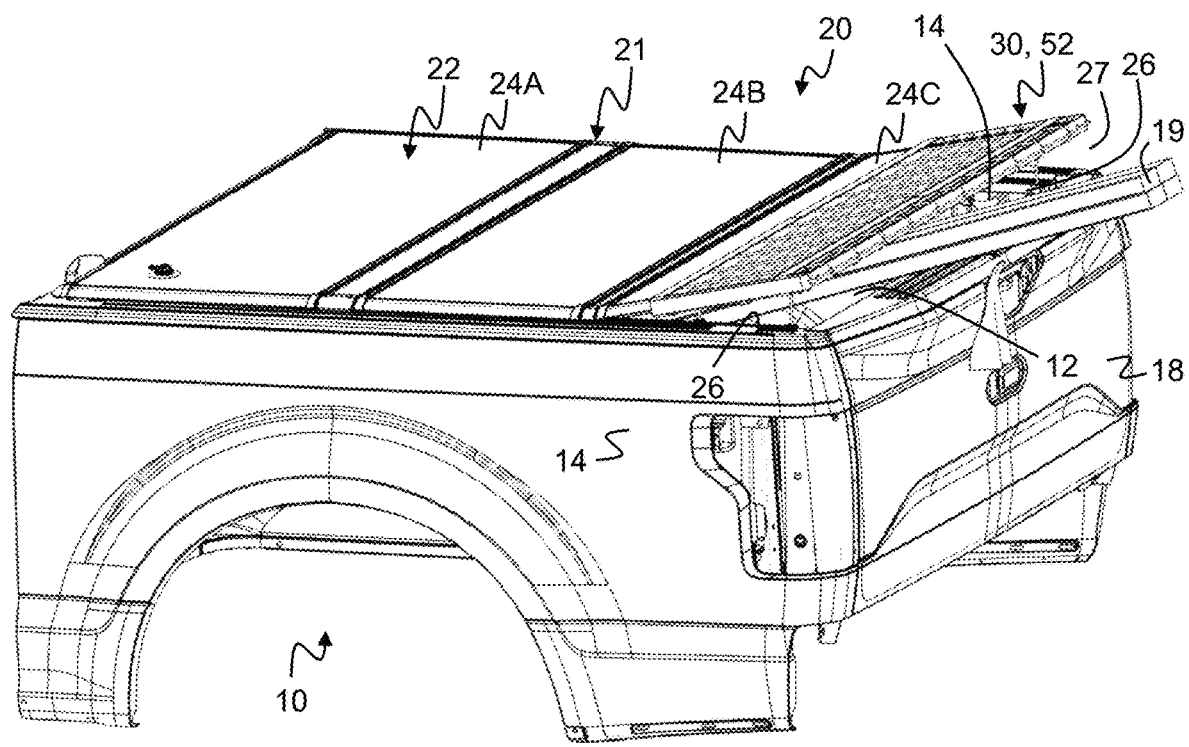
FIG. 1 is a perspective view of a vehicle and a tonneau cover system installed thereon.

The present teachings meet one or more of the above needs by the improved device, system, and method described herein.

The present disclosure provides for a tonneau cover system. The tonneau cover system may function to selectively cover a cargo area, protect a cargo area, protect cargo, secure cargo, or any combination thereof. As referred to herein, secure means to prevent movement of cargo being stored in the cargo area, prevent cargo being stored in the cargo area from falling out of the cargo area, or both. The tonneau cover system may comprise a tonneau cover assembly, a cargo securing device, or both. A cargo securing device may be installed onto a tonneau cover assembly.

The tonneau cover system may be utilized on a vehicle. The vehicle may include a sedan, a crossover SUV, an SUV, a pickup truck, a flatbed truck, a trailer, a flatbed trailer, the like, or any combination thereof. The vehicle may include one or more passenger compartments (i.e., "cab") situated at the front of the vehicle, one or more cargo areas situated at the rear of the vehicle behind the one or more passenger compartments, or both. The one or more cargo areas may be towed behind a vehicle. The cargo area may comprise one or more structures, which define the cargo area. The one or more structures may include a floor, one or more sidewalls, a front wall, a tailgate, or any combination thereof. The one or more structures may be fixed to a vehicle, movable relative to a vehicle, removable from a vehicle, or any combination thereof. One or more structures may be fixed to one or more other structures, movable relative to one or more other structure, removable from one or more other structures, or any combination thereof. The one or more sidewalls may be in opposing relationship with one another. The front wall may be in opposing relationship with the tailgate. The one or more sidewalls may be adjacent to the front wall, the floor, the tailgate, or any combination thereof. The one or more sidewalls, the front wall, the tailgate, or any combination thereof may be situated around a perimeter of the floor. The one or more sidewalls, the front wall, the tailgate, or any combination thereof may be situated approximately perpendicular to the floor. The one or more sidewalls, the front wall, the tailgate, or any combination thereof may define an opening opposing the floor. The opening may provide access into the cargo area. The cargo area may include one or more anchors. The one or more anchors may function to provide tie-down interfaces. The one or more anchors may comprise holes, bars, rings, straps, loops, the like, or any combination thereof. The one or more anchors may interact with one or more retaining members of a cargo securing device. The one or more anchors may be located on a floor, one or more sidewalls, a front wall, a tailgate, or any combination thereof. The one or more anchors may be located on the tops of the sidewalls, the tops being in opposing relationship to the floor. The one or more anchors may be located on undersides of the sidewalls, the undersides being in opposing relationship to the tops of the sidewalls. The one or more anchors may be located on inner sides of the sidewalls, the inner sides facing toward a centerline of a cargo area. The inner side of one sidewall may be in opposing relationship to an inner side of another sidewall. The cargo area may be approximately symmetrically arranged along a centerline (i.e., longitudinal axis) extending from the front wall to the tailgate. The centerline may be colinear with the centerline of the vehicle extending from the front of the vehicle to the rear of the vehicle through the one or more passenger compartments, the one or more cargo areas, or both. It may be desirable to cover the cargo area to provide security, prevent intrusion of rain, prevent intrusion of wind, prevent intrusion of debris, or any combination thereof. A tonneau cover assembly may be utilized to cover the cargo area to achieve the aforementioned effects.

The tonneau cover system may be employed to protect and/or secure cargo. The cargo may be stored within a cargo area. The cargo may include luggage, tools, construction materials, sports equipment, other personal and/or occupational property, the like, or any combination thereof. The cargo may protrude outside of a cargo area. Cargo that protrudes outside of a cargo area may be referred to as oversized cargo. The cargo may protrude past an opening of a cargo area. The cargo may protrude past one or more sidewalls, a front wall, a tailgate, or any combination thereof. The cargo may protrude past an opened tailgate. The cargo may rest against one or more sidewalls, a front wall, a tailgate, or any combination thereof. The cargo may be supported by a floor of a cargo area.

The tonneau cover system may comprise a tonneau cover assembly. The tonneau cover assembly may function to selectively cover a cargo area and/or cargo, protect a cargo area and/or cargo, or both. The tonneau cover assembly may be installed on a front wall, one or more sidewalls, a tailgate or any combination thereof. The tonneau cover assembly may be situated over an opening of a cargo area. The tonneau cover assembly may oppose a floor of a cargo area. The tonneau cover assembly may include a tonneau cover, one or more panels, one or more frame rails, or any combination thereof.

The tonneau cover assembly may comprise a tonneau cover. The tonneau cover may function to selectively cover a cargo area and/or cargo, protect a cargo area and/or cargo, or both. The tonneau cover may comprise one or more panels. The tonneau cover may comprise one panel or more, two panels or more, three panels or more, four panels or more, or even five panels or more. The tonneau cover may be a hard panel tonneau cover, a soft panel tonneau cover, or both. The one or more panels may be defined by a length, a width, a thickness, or any combination thereof. The length may extend between the one or more frame rails of a tonneau cover assembly, opposing sidewalls of a cargo area, or both. The width may extend between adjacent panels, a front wall, a tailgate, or any combination thereof. The thickness may extend orthogonal to the dimensions of length and width. The one or more panels may be selectively folded to uncover the cargo area and/or un-folded to cover the cargo area. The one or more panels may include a latch mechanism. The latch mechanism may engage one or more frame rails when the one or more panels are un-folded. The latch mechanism may be located on a side of the one or more panels facing a floor when the one or more panels are un-folded. A portion of the latch mechanism may extend beyond one or more edges of the one or more panels. The one or more panels may be folded toward a front wall of a cargo area, a tailgate of a cargo area, one or more sidewalls of a cargo area, or any combination thereof. The one or more panels may fold onto each other. The one or more panels may be situated in a partially open position whereby the one or more panels are neither completely folded or un-folded. The partially open position may be influenced by cargo protruding outside of a cargo area. In the partially open position, the one or more panels may rest against cargo. In a partially open position, the one or more panels may be situated at an angle from the opening of the cargo area, the floor of the cargo area, the one or more sidewalls of the cargo area, or any combination thereof. The angle may be about 10° or more, 20° or more, 30° or more, or even 40° or more. The angle may be about 90° or less, 80° or less, 70° or less, or even 60° or less. In the partially open position, there may be a gap between the one or more panels and one or more sidewalls, a front wall, a tailgate, or any combination thereof. The cargo may protrude through the gap.

The tonneau cover assembly may comprise one or more frame rails. The one or more frame rails may function to support the tonneau cover, the one or more panels, or both over the cargo area. The one or more frame rails may include elongate members. The one or more frame rails may be supported by a front wall, one or more sidewalls, a tailgate, or any combination thereof. The one or more frame rails may be installed on a front wall, one or more sidewalls, a tailgate, or any combination thereof. The one or more frame rails may be installed on opposing sidewalls. The one or more frame rails may be installed on top of a front wall, one or more sidewalls, a tailgate, or any combination thereof, the top being in opposing relationship to a floor of a cargo area. The one or more frame rails may be installed on an underside of a front wall, one or more sidewalls, a tailgate, or any combination thereof, the underside being in opposing relationship to the top and facing a floor of a cargo area. The one or more frame rails may be installed on an inner surface of a front wall, one or more sidewalls, a tailgate, or any combination thereof, the inner surface being a surface facing toward a centerline of a cargo area. The one or more frame rails may be defined by a length, a width, a thickness, or any combination thereof. The length may extend between a front wall, one or more sidewalls, a tailgate, or any combination thereof. The width may extend from one or more sidewalls toward a centerline of a cargo area. The width may extend from a front wall toward a tailgate or vice versa. The thickness may extend orthogonal to the dimensions of length and width. The one or more frame rails may be removably installed on a front wall, one or more sidewalls, a tailgate, or any combination thereof. The one or more frame rails may be fastened to a front wall, one or more sidewalls, a tailgate, or any combination thereof. The one or more frame rails may be fastened by one or more clamps, rivets, bolts, nuts, the like, or any combination thereof. The one or more frame rails may extend from a front wall of a cargo area to a tailgate of a cargo area, at least a portion thereof, or vice versa. The one or more frame rails may include one or more anchors. The one or more anchors may function to provide tie-down interfaces. The one or more anchors may comprise holes, bars, rings, straps, loops, the like, or any combination thereof. The one or more anchors may interact with one or more retaining members of a cargo securing device.

The tonneau cover system may comprise a cargo securing device. The cargo securing device may function to secure cargo, store cargo, or any combination thereof. The cargo securing device may be removably engaged with one or more panels. The cargo securing device may selectively slide onto and/or off of one or more panels of a tonneau cover. The cargo securing device may surround at least a portion of one or more panels of a tonneau cover. The cargo securing device may surround a rearmost portion of one or more panels, a frontmost portion of one or more panels, or both. The rearmost portion may refer to an edge oriented toward a tailgate when a tonneau cover is un-folded. The frontmost portion may refer to an edge oriented toward a front wall when a tonneau cover is un-folded. The cargo securing device may depend from one or more structures of a cargo area. The cargo securing device may be removably engaged, via one or more retaining members, with one or more frame rails, a floor, one or more sidewalls, a front wall, a tailgate, one or more anchors, a vehicle hitch, a vehicle frame, a vehicle bumper, or any combination thereof. The cargo securing device may be fastened to one or more panels. The cargo securing device may be fastened by one or more clamps, rivets, bolts, nuts, snaps, clips, hook-and-loop type fasteners (e.g., Velcro®), the like, or any combination thereof. One or more panels may be removed and replaced by the cargo securing device. For example, a panel may be removed from hinged engagement with an adjacent panel and the cargo securing device can be attached to the remaining panel by a hinged engagement. The cargo securing device may be situated in a cargo area configuration, a tonneau cover configuration, or both. The cargo securing device may comprise one or more sleeves, sides, edges, peripheral members, transverse members, shrouds, pockets, openings, retaining members, anchors, or any combination thereof.

The cargo securing device may be situated in a cargo area configuration. In the cargo area configuration, a cargo securing device may be located within a cargo area. In the cargo area configuration, a cargo securing device may engage, via one or more retaining members, one or more frame rails, a floor, one or more sidewalls, a front wall, a tailgate, one or more anchors, a vehicle hitch, a vehicle frame, a vehicle bumper, or any combination thereof. In the cargo area configuration, a cargo securing device may depend from one or more sidewalls, a front wall, a tailgate, one or more anchors, or any combination thereof. In the cargo area configuration, a cargo securing device may be supported by one or more structures of a cargo area via one or more retaining members. In the cargo area configuration, a cargo securing device may be oriented approximately perpendicular to a floor of a vehicle. In the cargo area configuration, a cargo securing device may be oriented at an angle to a floor of a vehicle. In the cargo area configuration, an opening of a cargo securing device may be oriented in opposing relationship to a floor of a vehicle.

The cargo securing device may be situated in a tonneau cover configuration. In the tonneau cover configuration, a cargo securing device may surround one or more panels of a tonneau cover. In the tonneau cover configuration, a cargo securing device may be situated above a cargo area or flush with an opening of a cargo area. In the tonneau cover configuration, a cargo securing device may engage, via one or more retaining members, one or more frame rails, a floor, one or more sidewalls, a front wall, a tailgate, one or more anchors, a vehicle hitch, a vehicle frame, a vehicle bumper, or any combination thereof. In the tonneau cover configuration, a cargo securing device may be in contact with cargo. In the tonneau cover configuration, one or more retaining members may cause the cargo securing device, one or more panels, or both to clamp cargo against a tailgate, a front wall, one or more side walls, or any combination thereof. In the tonneau cover configuration, one or more retaining members may depend from a cargo securing device. In the tonneau cover configuration, a cargo securing device may remain on one or more panels when the one or more panels are un-folded. The cargo securing device may not interfere with a generally flush engagement of one or more panels with one or more frame rails.

The cargo securing device may comprise one or more sleeves. The one or more sleeves may function to surround one or more panels of a tonneau cover, secure cargo, store cargo, or any combination thereof. The one or more sleeves may comprise a first side, a second side, or both. The first side, the second side, or both may be defined by one or more peripheral and/or transverse members, one or more shrouds, or both. The first side, the second side, or both may be separated by a pocket. The first side and the second side may be in opposing relationship. The first side, the second side, or both may be generally planar. The first side and the second side may be positionable on opposing sides of one or more panels of a tonneau cover. The first side may be configured to face away from a floor of a vehicle in a tonneau cover configuration when the tonneau cover is un-folded. The second side may be configured to face toward a floor of a vehicle in a tonneau cover configuration when the tonneau cover is un-folded. This orientation may be flipped when the tonneau cover is folded. The one or more sleeves may comprise one or more edges. The one or more edges may extend around a perimeter of the sleeve, the first side, the second side, or any combination thereof. The first side, the second side, or both may be conjoined at one or more edges. The one or more sleeves may include two or more short edges and two or more long edges. The one or more edges may include one or more closed edges, one or more open edges, or both. The one or more closed edges may include one or more peripheral members thereon. One or more shrouds on a first side and one or more shrouds on a second side may be conjoined along the one or more closed edges. The one or more open edges may include one or more openings providing access to a pocket. The one or more open edges may be at least partially free of one or more peripheral members. One or more shrouds on a first side and one or more shrouds on a second side may not be conjoined along the one or more open edges. One or more fasteners may be situated abutting or proximate to the one or more open edges. The one or more fasteners may selectively join, at least partially, a first side and a second side along the one or more open edges. The one or more fasteners may be located on one or more peripheral and/or transverse members, shrouds, or both. The one or more fasteners may include zippers, snap rivets, clips, ties and loops, magnets, or any combination thereof. The clips, ties, loops, or any combination thereof may be accepted by through-holes formed in a sleeve. The through-holes may include grommets. The first side, second, side, one or more edges, or any combination thereof may define a pocket. Two or more sleeves or elements thereof may be conjoined to provide two or more pockets. The one or more sleeves may be defined by a longitudinal axis, a lateral axis, a perpendicular axis, or any combination thereof. The longitudinal axis may extend through two opposing edges. The longitudinal axis may extend through two opposing closed edges. The longitudinal axis may extend along a length of the one or more sleeves. The lateral axis may extend through two opposing edges. The lateral axis may extend through an opposing closed edge and open edge. The lateral axis may extend along a width of the one or more sleeves. The perpendicular axis may extend through a first side and a second side. The perpendicular axis may be perpendicular to both the longitudinal axis and the lateral axis. The one or more sleeves may surround at least a portion of one or more panels, two or more panels, or even three or more panels of a tonneau cover. The one or more sleeves may surround a tailgate. The one or more sleeves may selectively slide onto one or more panels and/or slide off of one or more panels. The one or more sleeves may surround a portion of one or more panels. The one or more sleeves may surround a rearmost portion of one or more panels, a frontmost portion of one or more panels, or both. The rearmost portion may refer to any portion proximate an edge of one or more panels oriented toward a tailgate. The frontmost portion may refer to any portion proximate an edge of one or more panels oriented toward a front wall. The one or more sleeves may be situated intermediate a tonneau cover and cargo. A length of the one or more sleeves may be approximately equal to or larger than a length of one or more panels. A width of the one or more sleeves may be approximately equal to, less than, or larger than a width of one or more panels. The one or more sleeves may protect a tonneau cover from damage that would otherwise be cause by cargo rubbing against and/or striking the tonneau cover. Two or more sleeves or portions thereof may be combined to provide two or more pockets. The one or more sleeves may include an aperture through which a latch mechanism of a tonneau cover may pass through. The aperture may allow for the latch mechanism to engage one or more frame rails of the tonneau cover assembly. The aperture may be located on a second side of the one or more sleeves. The one or more sleeves may comprise one or more sides, edges, peripheral members, transverse members, shrouds, pockets, openings, or any combination thereof.

The cargo securing device may comprise one or more peripheral members, transverse members, or both. The one or more peripheral and/or transverse members may function to define a pocket, structurally reinforce the sleeve, space apart one or more shrouds, bridge one or more shrouds, or any combination thereof. The one or more peripheral and/or transverse members may surround one or more panels of a tonneau cover. The one or more peripheral members may be situated on one or more of the edges of a sleeve. The one or more peripheral members may extend at least partially along one or more edges of a sleeve. The one or more peripheral members may space apart a first side and a second side of a sleeve. The one or more peripheral members may bridge one or more shrouds located on a first side and one or more other shrouds located on a second side of a sleeve. One or more shrouds may be coupled to opposing edges of the one or more peripheral members. The one or more peripheral members may be defined by a width, which is oriented along a perpendicular axis of a sleeve, and that is approximately equal to or larger than a width of one or more panels of a tonneau cover. The one or more peripheral members may be defined by a length, which is oriented along either a longitudinal axis or a lateral axis of a sleeve, and that is approximately equal to, larger than, or less than a length and/or width of one or more panels of a tonneau cover. The one or more transverse members may extend at least partially between two or more edges of a sleeve. The one or more transverse members may wrap around one or more edges of a sleeve. The one or more transverse members may extend between two or more opposing edges of a sleeve. The one or more transverse members may extend between two or more adjacent edges of a sleeve. The one or more transverse members may extend between closed edges of the sleeve, open edges of the sleeve, or both. The one or more transverse members may be located on a first side, a second side, or both. The one or more transverse members may overlay one or more peripheral members or vice versa. The one or more transverse members may terminate at one or more peripheral members or vice versa. The one or more peripheral and/or transverse members may be integrally formed together. The one or more peripheral and/or transverse members may be mechanically and/or chemically coupled to one or more other peripheral and/or transverse members. The one or more peripheral and/or transverse members may be mechanically and/or chemically coupled to one or more shrouds. Mechanical coupling may include interweaving, stitching, riveting, bolting, screwing, or any combination thereof. Chemical coupling may include use of an epoxy adhesive, cyanoacrylate adhesive, urethane adhesive, or any combination thereof. The one or more peripheral and/or transverse members may be rigid, flexible, elastic, or any combination thereof. The one or more peripheral and/or transverse members may be fabricated from fabric, one or more solid panels, or any combination thereof. The one or more peripheral and/or transverse members may be fabricated from material that is different from and/or the same as one or more other peripheral and/or transverse members. The one or more peripheral and/or transverse members may be fabricated from material that is different from and/or the same as one or more shrouds. The fabric may be fabricated from one or more types of materials. The materials may include synthetic fiber, natural fiber, or both. The synthetic fiber may include polyester, polypropylene, nylon, polyethylene, aramids, acrylics, or any combination thereof. The natural fiber may include manila hemp, hemp, linen, cotton, coir, jute, straw, sisal, or any combination thereof. The fabric may include an elastomer, rubber, or both to impart elasticity. The fabric may be coated to impart water resistance. The fabric may comprise one or more anchors coupled thereto to provide one or more tie-down interfaces. The one or more tie-down interfaces may be utilized to secure cargo to a sleeve. The one or more solid panels may be fabricated from one or more types of material. The one or more solid panels may be rigid, flexible, or both. The one or more solid panels may be fabricated from metal, polymer, or both. The metal may include aluminum, tin, steel, titanium, or any combination thereof. The polymer may include polyethylene, polypropylene, polyvinylchloride, polyamide, polycarbonate, polymethylmethacrylate, or any combination thereof. The one or more solid panels may be fabricated from the same type of material as the one or more panels of the tonneau cover. The one or more peripheral and/or transverse members may include one or more retaining members coupled thereto. The one or more retaining members may be movably and/or statically coupled to the one or more peripheral and/or transverse members. The one or more retaining members may be integrally coupled and/or removably coupled to the one or more peripheral and/or transverse members. The one or more peripheral and/or transverse members may include a groove and/or channel within which one or more retaining members may translate. The one or more retaining members may translate along a perpendicular axis, lateral axis, or both of a sleeve. The one or more sleeves may comprise one or more peripheral and/or transverse members, shrouds, or both.

The one or more sleeves may comprise one or more shrouds. The one or more shrouds may function to surround one or more panels of a tonneau cover, cover one or more panels of a tonneau cover, secure cargo, or both. The one or more shrouds may extend between a first side, a second side, or both of a sleeve. The one or more shrouds may extend between one or more edges of a sleeve. The one or more shrouds may extend between opposing edges, adjacent edges, or both. The one or more shrouds may be coupled to one or more peripheral and/or transverse members. The one or more shrouds may overlay one or more peripheral and/or transverse members, vice versa, or both. The one or more shrouds on a first side of a sleeve may be coupled to one or more shrouds on a second side of a sleeve. Two or more shrouds may be coupled together along one or more edges of one or more sleeves. One or more shrouds may be coupled to one or more peripheral and/or transverse members. The one or more shrouds may mechanically and/or chemically coupled together and/or to one or more peripheral and/or transverse members. Mechanical coupling may include interweaving, stitching, riveting, screwing, or any combination thereof. Chemical coupling may include using epoxy adhesive, cyanoacrylate adhesive, urethane adhesive, or any combination thereof. The one or more shrouds, peripheral members, transverse members, edges, or any combination thereof may define a pocket. The one or more shrouds may be rigid, flexible, elastic, or any combination thereof. The one or more shrouds may be fabricated from a net, fabric, one or more solid panels, or any combination thereof. The net may be fabricated from rope (i.e., "cord"). The rope may be single braided, double braided, diamond braided, twisted, or any combination thereof. The rope may be fabricated from one or more types of materials. The materials may include synthetic fiber, natural fiber, or both. The synthetic fiber may include polyester, polypropylene, nylon, polyethylene, aramids, acrylics, or any combination thereof. The natural fiber may include manila hemp, hemp, linen, cotton, coir, jute, straw, sisal, or any combination thereof. The rope may include an elastomer, rubber, or both to impart elasticity. The rope may be coated to impart water resistance. The rope may have a diameter of 2 mm or more, 2.5 mm or more, 3 mm or more, or even 3.5 mm or more. The rope may have a diameter of 8 mm or less, 7.5 mm or less, 7 mm or less, or even 6.5 mm or less. The net may be knotted or knotless. The net may include holes in between the rope. The holes may be parallelogram shaped, rhombus shaped, or any other suitable shape conventionally formed by netting. The holes may include edges having a length of 1 cm or more, 2 cm or more, 3 cm or more, or even 4 cm or more. The holes may include edges having a length of 10 cm or less, 9 cm or less, 8 cm or less, or even 7 cm or less. The net may naturally provide a plurality of tie-down interfaces. For example, a bungee cord may fasten to the net at one end, wrap around cargo, fasten to the net at another end, and thereby secure cargo to the sleeve. The fabric may be fabricated from one or more types of materials. The materials may include synthetic fiber, natural fiber, or both. The synthetic fiber may include polyester, polypropylene, nylon, polyethylene, aramids, acrylics, or any combination thereof. The natural fiber may include manila hemp, hemp, linen, cotton, coir, jute, straw, sisal, or any combination thereof. The fabric may include an elastomer, rubber, or both to impart elasticity. The fabric may be coated to impart water resistance. The fabric may comprise one or more anchors coupled thereto to provide one or more tie-down interfaces. The one or more solid panels may be fabricated from one or more types of material. The one or more solid panels may be rigid, flexible, or both. The one or more solid panels may be fabricated from metal, polymer, or both. The metal may include aluminum, steel, titanium, or any combination thereof. The polymer may include polyethylene, polypropylene, polyvinylchloride, polyamide, polycarbonate, polymethylmethacrylate, or any combination thereof. The one or more solid panels may be fabricated from the same type of material as the one or more panels of the tonneau cover. The one or more panels may include one or more anchors coupled thereto. The one or more anchors may function to provide tie-down interfaces. The one or more anchors may comprise holes, bars, rings, straps, loops, the like, or any combination thereof.

The cargo securing device may comprise one or more openings. The one or more openings may function to provide access to one or more pockets, allow cargo and/or a tonneau cover to pass therethrough, or both. The one or more openings may be located along one or more edges (i.e., open edge) of a sleeve. The one or more openings may be located between a first side and a second side of a sleeve. The one or more openings may be located between ends of two opposing closed edges of a sleeve. The one or more openings may be sealable. The one or more openings may be sealable by one or more fasteners situated abutting or proximate to one or more edges of a sleeve. The one or more fasteners may include zippers, snap rivets, clips, ties and loops, magnets, or any combination thereof. The clips, ties, loops, or any combination thereof may be accepted by through-holes formed in a sleeve. The through-holes may include grommets.

The cargo securing device may comprise one or more pockets. The one or more pockets may function to receive one or more panels of a tonneau cover, store cargo, or both. The one or more pockets may be defined by one or more sleeves, sides, edges, peripheral members, transverse members, shrouds, or any combination thereof. The one or more pockets may be defined by a length, width, depth, or any combination thereof. The length may extend along a longitudinal axis of a sleeve. The width may extend along a perpendicular axis of a sleeve. The depth may extend along a lateral axis of a sleeve. The length may be approximately equal to or greater than a length of one or more panels. The width may be approximately equal to a thickness of one or more panels. The depth may be approximately equal to, less than, or greater than a width of one or more panels. A width of the one or more pockets may be substantially uniform or non-uniform along a sleeve. For example, a width of the one or more pockets may taper from one edge of a sleeve to an opposing edge of the sleeve. The one or more pockets may include a spacer therein. The spacer may be situated adjacent an edge of a sleeve opposing an opening. The spacer may function to cause an edge of a sleeve to extend beyond an edge of a panel of a tonneau cover.

The cargo securing device may include one or more retaining members. The one or more retaining members may function to cause the sleeve, the tonneau cover, or both to clamp cargo against one or more structures of a cargo area;

retain one or more panels and/or sleeves in place; support the sleeve from one or more structures of a cargo area; or any combination thereof. The one or more retaining members may be coupled to a sleeve. The one or more retaining members may be coupled to one or more peripheral members, transverse members, shrouds, or any combination thereof. The one or more retaining members may be located on or adjacent to one or more edges of a sleeve. The one or more retaining members may be located proximate one or more edges of a sleeve. The one or more retaining members may be located proximate a center of one or more edges, peripheral members, transverse members, shrouds, or any combination thereof. The one or more retaining members may be located proximate ends of one or more edges, peripheral members, transverse members, or any combination thereof. The one or more retaining members may be located anywhere between two or more edges of the sleeve. The one or more retaining members may include one or more forward retaining members. The one or more forward retaining members may be located proximate to an opening of a sleeve. The one or more retaining members may include one or more rearward retaining members. The one or more rearward retaining members may be located proximate to an edge of a sleeve opposing an opening of a sleeve. The forward pair and/or rearward pair of retaining members may be located proximate to opposing edges of a sleeve. The one or more retaining members may be coupled to a first side, a second side, or both of a sleeve. It may be particularly advantageous to couple the one or more retaining members to a second side so that the one or more retaining members extend directly between the sleeve and one or more frame rails of the tonneau cover assembly rather than wrapping around one or more edges of a sleeve. The one or more retaining members may be coupled to a sleeve by a sleeve engagement portion. The one or more retaining members may be statically coupled to the sleeve. The one or more retaining members may be movably coupled to the sleeve. In the cargo area configuration, the one or more retaining members may engage one or more frame rails, a floor, one or more sidewalls, a front wall, a tailgate, one or more anchors, a vehicle hitch, a vehicle frame, a vehicle bumper, or any combination thereof. In the tonneau cover configuration the one or more retaining members may engage one or more frame rails, a floor, one or more sidewalls, a front wall, a tailgate, one or more anchors, a vehicle hitch, a vehicle frame, a vehicle bumper, or any combination thereof. In a cargo area configuration, the one or more retaining members may support the cargo securing device from one or more structures of a cargo area. In a tonneau cover configuration, the one or more retaining members may depend from a sleeve. The one or more retaining members may comprise a fastening portion, one or more handles, a connecting portion, a sleeve engagement portion, or any combination thereof.

The one or more retaining members may include a fastening portion. The fastening portion may function to selectively engage with one or more frame rails, a floor, one or more sidewalls, a front wall, a tailgate, one or more anchors, a vehicle hitch, a vehicle frame, a vehicle bumper, or any combination thereof. The fastening portion may be located on an end of the one or more retaining members distal from the sleeve. The fastening portion may include one or more of a hook, a clip, a tie, a loop, or any combination thereof. The fastening portion may be specifically configured to fit to one or more frame rails, a floor, one or more sidewalls, a front wall, a tailgate, one or more anchors, a vehicle hitch, a vehicle frame, a vehicle bumper, or any combination thereof. The fastening portion may include two or more of a hook, a clip, a tie, a loop, or any combination thereof, each of which is specifically configured to fit to different portions of a tonneau cover assembly, a vehicle, or both. For example, the fastening portion may include a hook shaped to engage with one or more frame rails and a hook shaped to engage with one or more anchors. The fastening portion may be coupled to a connecting portion. The fastening portion may be integrally formed with a connecting portion. The fastening portion may be mechanically and/or chemically coupled to a connecting portion. Mechanical coupling may include tying, knotting, screw threading, or any combination thereof. For example, the connecting portion may extend through a through-hole in the fastening portion and a knot formed on the connecting portion may prevent the connecting portion from being removed from the through-hole. Chemical coupling may include using an epoxy adhesive, cyanoacrylate adhesive, urethane adhesive, or any combination thereof. The fastening portion may include one or more handles. The one or more handles may function to assist a user manipulate the fastening portion into engagement with one or more frame rails, a floor, one or more sidewalls, a front wall, a tailgate, one or more anchors, a vehicle hitch, a vehicle frame, a vehicle bumper, or any combination thereof The one or more retaining members may include a connecting portion. The connecting portion may function to conjoin the fastening portion and the sleeve engagement portion; cause the sleeve, one or more panels of a tonneau cover, or both to clamp cargo against one or more structures of a cargo area; or both. The connecting portion may be elastic, flexible, rigid, or any combination thereof. The connecting portion may comprise a rod, an elastic rope, a non-elastic rope, or any combination thereof. The connecting portion may be defined by a length. The length may extend between the fastening portion and the sleeve engagement portion. The length of the connecting portion may be adjustable. A length of one or more connecting portions of one or more forward retaining members may be the same as a length of one or more connecting portions of one or more rearward retaining members. A length of one or more connecting portions of one or more forward retaining members may be the shorter than a length of one or more connecting portions of one or more rearward retaining members. It may be particularly advantageous for the forward retaining member to have a shorter length than the rearward retaining member when the one or more panels of the tonneau cover are in a partially open position because in such position the distance of the one or more panels from the one or more frame rails increases from one end of the one or more panels to the other due to the angular orientation with respect to the one or more frame rails. A length of the connecting portion may be fixed. A length of the connecting portion may be adjustable. A length of the connecting portion may be adjustable so that a gap between the one or more panels and the tailgate can be configured to accommodate the cargo having various geometric dimensions. The length of the connecting portion may be adjustable by one or more cord locks, one or more cord adjusters, or both. The length of the connecting portion may be adjustable by screw threading, whereby the fastening portion, including threading, may be translatable along the screw threading. The connecting portion may include two ends. The connecting portion may be coupled to fastening portion at one end and a sleeve engagement portion at another end.

The one or more retaining members may include a sleeve engagement portion. The sleeve engagement portion may function to couple the one or more retaining members to the sleeve. The sleeve engagement portion s may be coupled to a sleeve. The sleeve engagement portion may be coupled to one or more peripheral members, transverse members, shrouds, or any combination thereof. The sleeve engagement portion may be located on or adjacent to one or more edges of a sleeve. The sleeve engagement portion may be located proximate one or more edges of a sleeve. The sleeve engagement portion may be located proximate a center of one or more edges, peripheral members, transverse members, shrouds, or any combination thereof. The sleeve engagement portion may be located proximate ends of one or more edges, peripheral members, transverse members, or any combination thereof. The sleeve engagement portion may be located anywhere between two or more edges of the sleeve. The sleeve engagement portion may be coupled to a first side a second side, or both of a sleeve. The sleeve engagement portion may be statically coupled to the sleeve. The sleeve engagement portion may be movably and/or slidably coupled to the sleeve. The sleeve engagement portion may slide along a rope comprising netting. The sleeve engagement portion may slide within a groove and/or channel of one or more peripheral and/or transverse members. The sleeve engagement portion may include a hook, a clip, a tie, a loop, or any combination thereof. The loop may be formed of an end of the connecting portion folded onto and coupled to itself. The sleeve engagement portion may be interwoven and/or stitched to a sleeve. The sleeve engagement portion may be integrally formed with a sleeve. The sleeve engagement portion may be chemically coupled to a sleeve. Chemical coupling may include use of an epoxy adhesive, cyanoacrylate adhesive, urethane adhesive, or any combination thereof.

Figure 6:
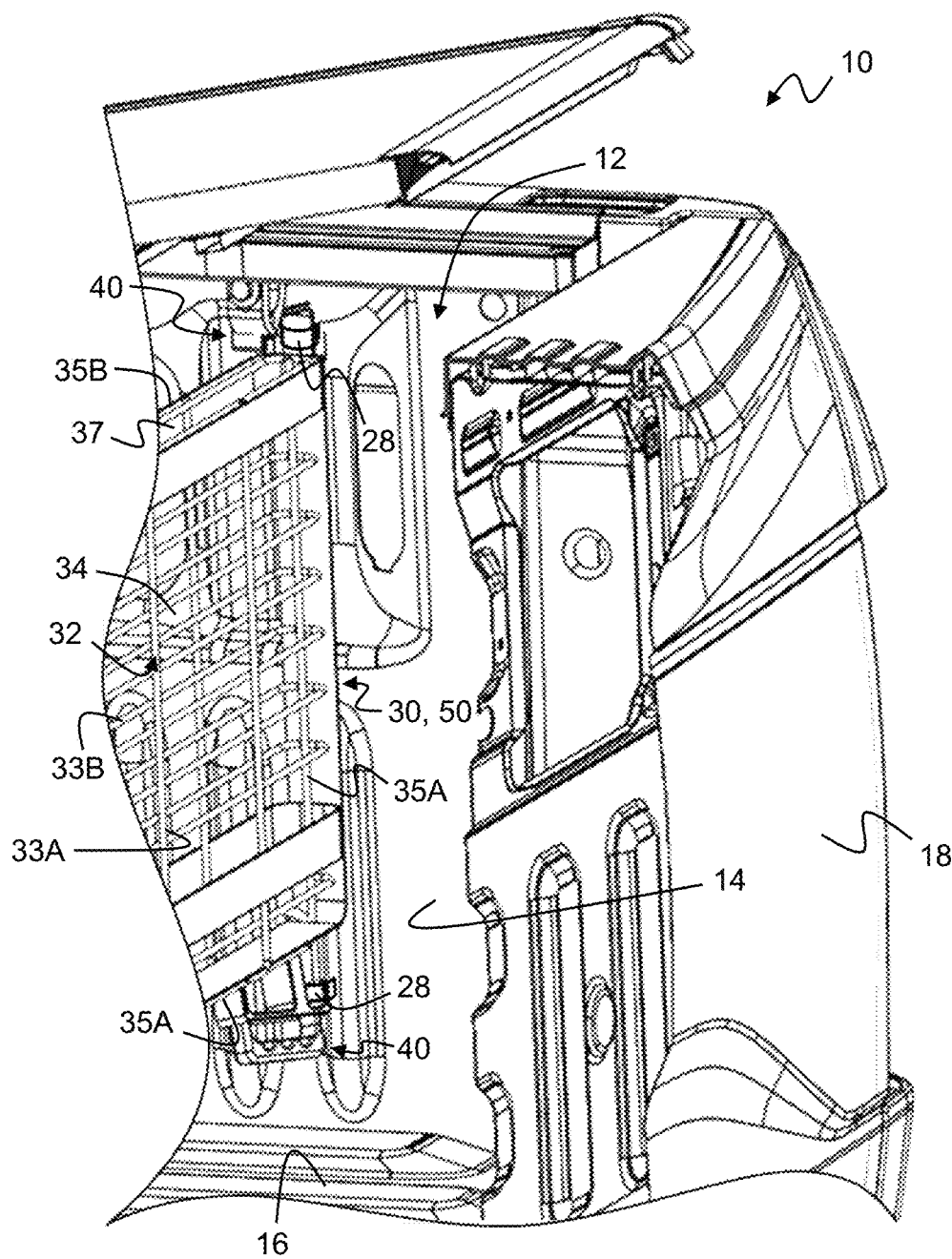
FIG. 6 is a perspective view of a cargo securing device inside of a cargo area of a vehicle.

FIG. 1 is a perspective view of a vehicle 10 and a tonneau cover system 20 installed thereon. The vehicle 10 includes a cargo area 12. The cargo area 12 is defined by two opposing sidewalls 14, a floor 16 as shown in FIG. 6, and a tailgate 18. The tonneau cover system 20 comprises a tonneau cover assembly 21 and the cargo securing device 30. The tonneau cover assembly 21 comprises two opposing frame rails 26 coupled to the two opposing sidewalls 14 and a tonneau cover 22 supported by the two opposing frame rails 26. The tonneau cover 22 comprises a first panel 24A, a second panel 24B, and a third panel 24C, which fold-up or un-fold to selectively cover or un-cover the cargo area 12. The cargo securing device 30 is illustrated in a tonneau cover configuration 52 whereby the cargo securing device 30 surrounds a portion of the third panel 24C. Cargo 19 is being stored in the cargo area 12 and is protruding outside of the cargo area 12 through a gap 27 between the tailgate 18 and the third panel 24C.

Figure 2A:
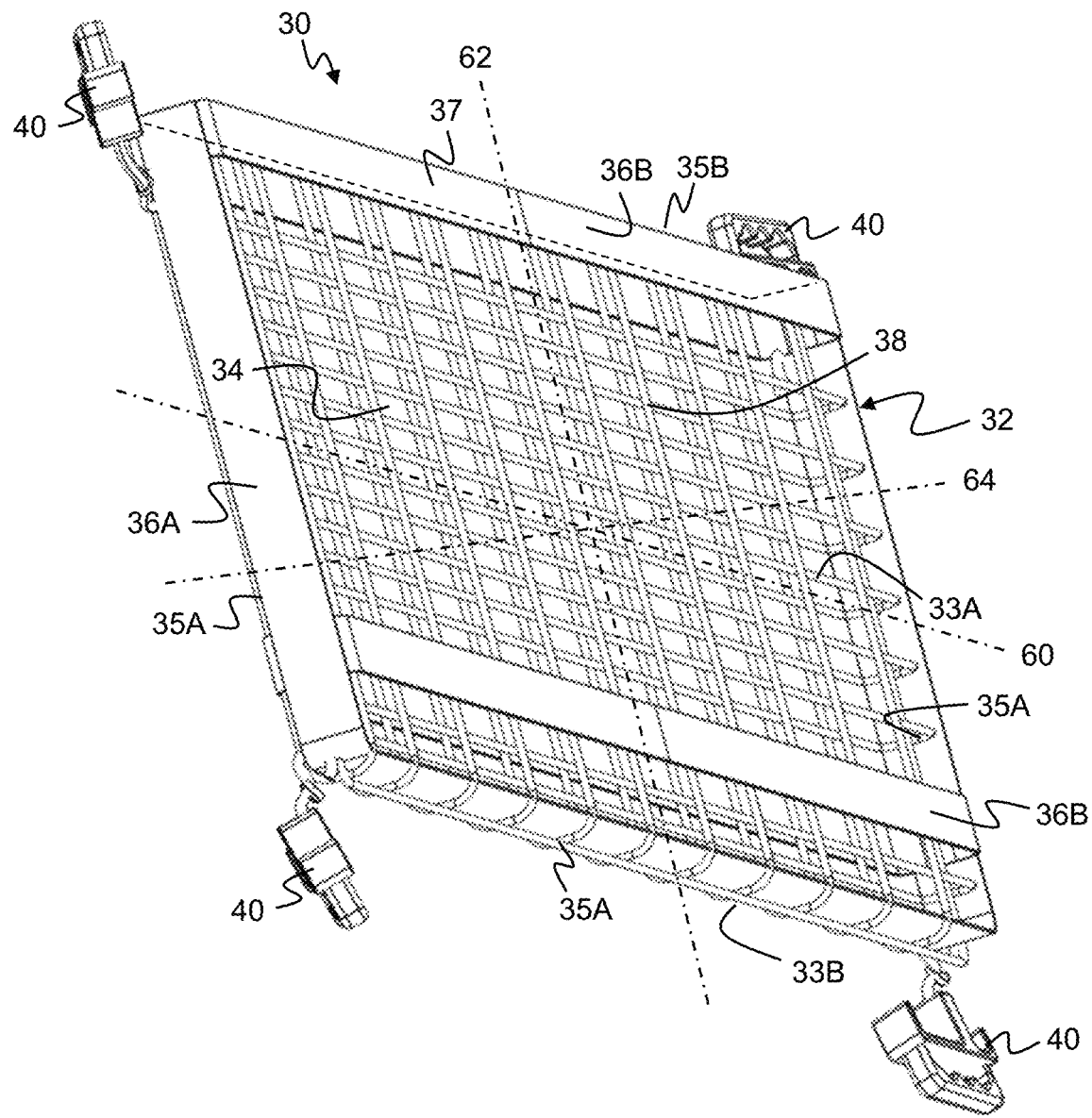
FIG. 2A is a perspective view of a cargo securing device.
Figure 2B:
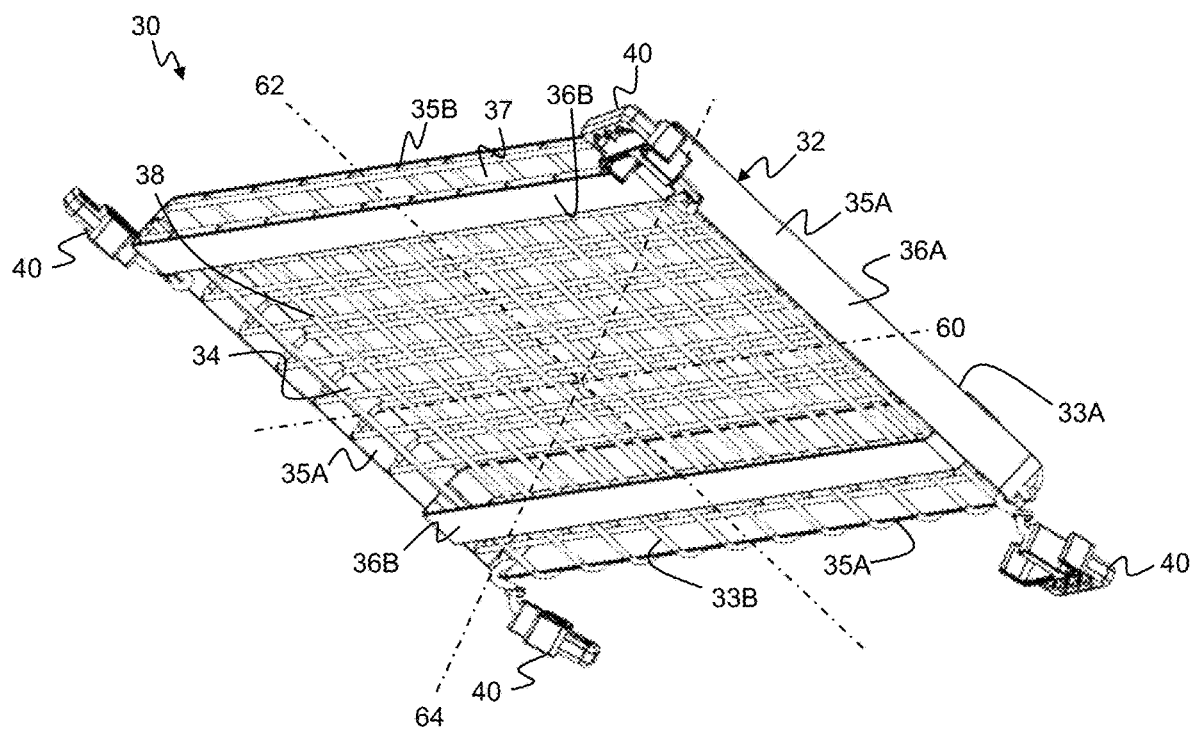
FIG. 2B is a perspective view of a cargo securing device.

FIG. 2A and FIG. 2B are perspective views of a cargo securing device 30. The cargo securing device 30 comprises a sleeve 32 and four retaining members 40. The sleeve 32 comprises a first side 33A and a second side 33B in opposing relationship to each other and four edges around a perimeter of the sleeve 32. The four edges include three closed edges 35A and an open edge 35B. Two of the closed edges 35A are in opposing relationship to each other and another closed edge 35A is in opposing relationship to an open edge 35B. The cargo securing device 30 is defined by a longitudinal axis 60, a lateral axis 62, and a perpendicular axis 64. The longitudinal axis 60 extends through two opposing closed edges 35A. The lateral axis 62 extends through an opposing closed edge 35A and open edge 35B. The perpendicular axis 64 extends through the first side 33A and the second side 33B and is oriented perpendicular to the longitudinal axis 60 and the lateral axis 62.

The sleeve 32 comprises a peripheral member 36A situated on the closed edges 35A of the sleeve 32. The sleeve 32 comprises two transverse members 36B extending between and wrapped around the two opposing closed edges 35A. One of the transverse members 36B abuts the open edge 35B and the other transverse member 36B is proximate a closed edge 35A that opposes the open edge 35B. The peripheral member 36A overlays the two transverse members 36B at the opposing closed edges 35A. The peripheral member 36A and transverse members 36B define a pocket 34. The pocket 34 is accessible via an opening 37 located along the open edge 35B. The opening 37 is located between two opposing closed edges 35A, the first side 33A, and the second side 33B.

The sleeve 32 comprises a shroud 38, which is illustrated as a net. The shroud 38 extends between the first side 33A, the second side 33B, the closed edges 35A, and the open edge 35B. The shroud 38 is coupled to the peripheral member 36A and the two transverse members 36B. The peripheral member 36A overlays the shroud 38 on the two opposing closed edges 35A. The transverse member 36A overlays the shroud 38 between and on the two opposing closed edges 35A. The shroud 38 overlays the peripheral member 36A at the closed edge 35A opposing the open edge 35B.

The retaining members 40 are coupled to the second side 33B of the sleeve 32. The sleeve engagement portions 46 of the retaining members 40 are looped around the second side 33B of the sleeve 32. The retaining members 40 are located proximate to opposing closed edges 35A of the sleeve 32. A pair of the retaining members 40 are located proximate to an open edge 35B of the sleeve 32 and another pair of the retaining members 40 are located proximate to a closed edge 35A of the sleeve 32 opposing the open edge 35B of the sleeve 32. The retaining members 40 are configured to selectively engage with either the frame rails 26 of the tonneau cover assembly 21, as shown in FIG. 4 and FIG. 5, or anchors 28 affixed to sidewalls 14 of a vehicle 10, as shown in FIG. 6.

Figure 3:
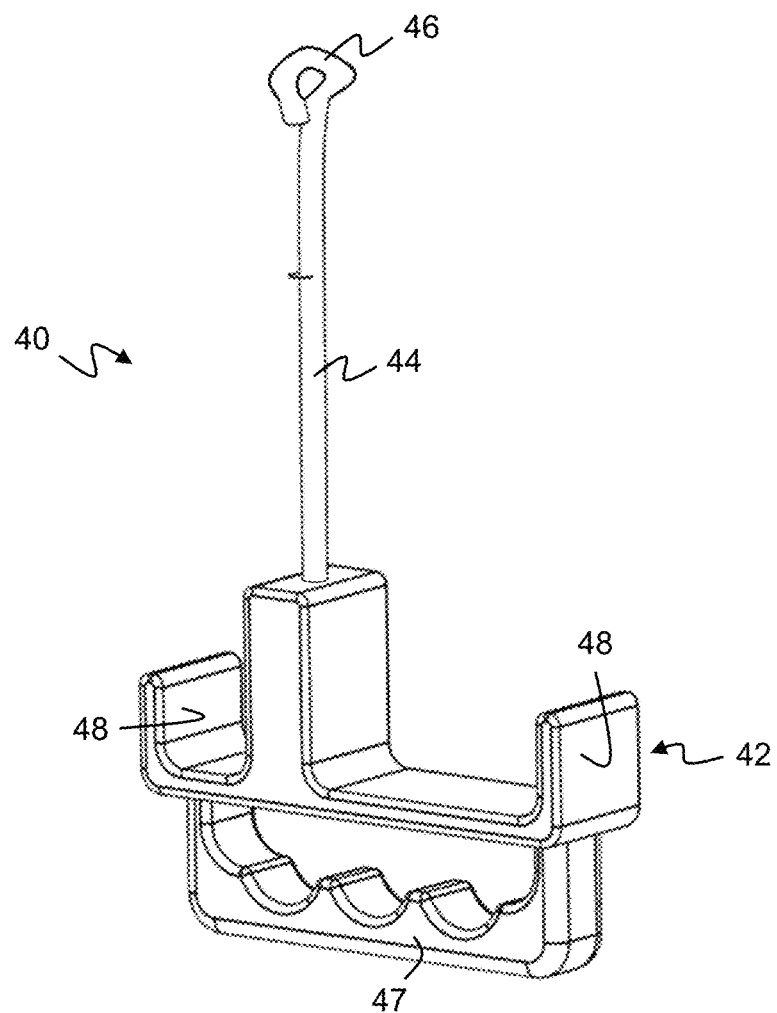
FIG. 3 is a perspective view of a retaining member.

FIG. 3 is a perspective view of a retaining member 40. The retaining member 40 comprises a fastening portion 42, a connecting portion 44, and a sleeve engagement portion 46. The fastening portion 42 selectively engages with either the frame rails 26 of the tonneau cover assembly 21, as shown in FIG. 4 and FIG. 5, or anchors 28 affixed to sidewalls 14 of a vehicle 10, as shown in FIG. 6. The fastening portion 42 includes two hooks 48. One of the hooks 48 is larger and sized to accept frame rails 26, as shown in FIG. 4. The other hook 48 is smaller and sized to accept anchors 28, as shown in FIG. 6. The fastening portion 42 includes a handle 47 to assist a user manipulate the fastening portion 42. The connecting portion 44 is attached to the fastening portion 42 and extends between the fastening portion 42 and the sleeve engagement portion 46. The sleeve engagement portion 46 is formed of the connecting portion 44 folded over onto and fastened to itself to form a closed loop. The sleeve engagement portion 46 loops around the second side 33B, as shown in FIG. 5.

Figure 4:
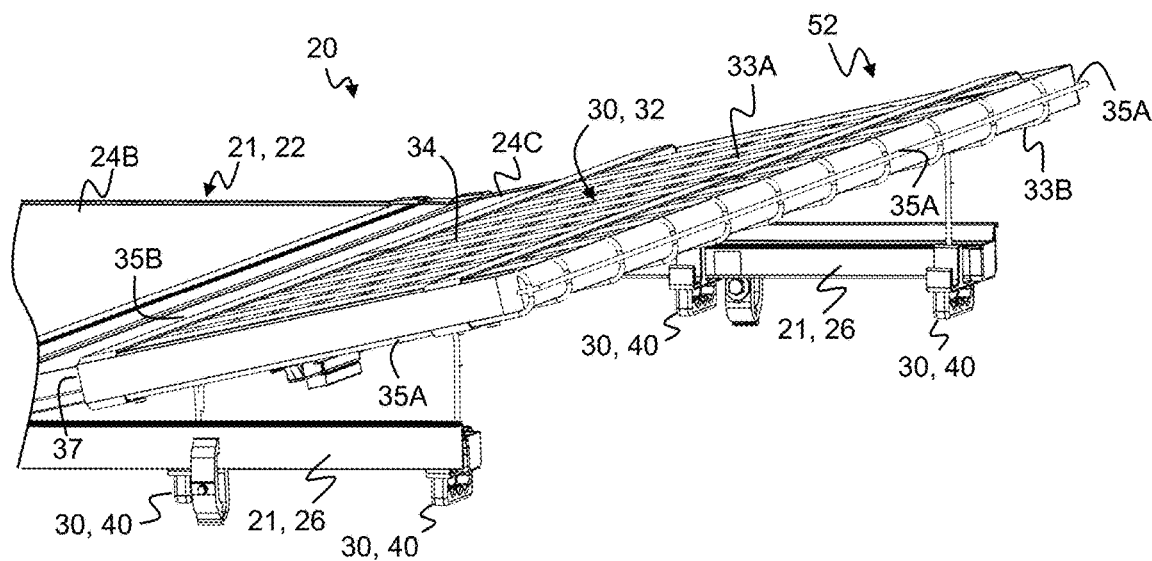
FIG. 4 is a perspective view of a tonneau cover system.
Figure 5:
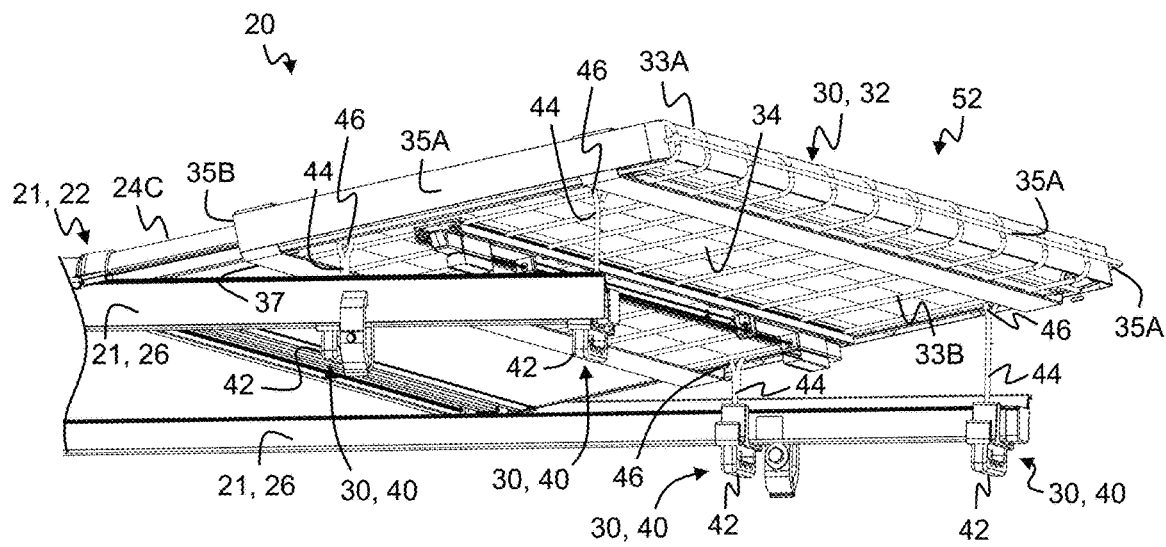
FIG. 5 is a perspective view of a tonneau cover system.

FIG. 4 and FIG. 5 are perspective views of a tonneau cover system 20. The tonneau cover system 20 comprises a tonneau cover assembly 21 and a cargo securing device 30. The tonneau cover assembly 21 comprises a tonneau cover 22 and two opposing frame rails 26. The two opposing frame rails 26 support the tonneau cover 22 over a cargo area 12, as shown in FIG. 1. The tonneau cover 22 comprises a first panel 24A as shown in FIG. 1, a second panel 24B, and a third panel 24C.

The cargo securing device 30 comprises a sleeve 32 and four retaining members 40. The sleeve 32 comprises a first side 33A, a second side 33B, three closed edges 35A, and an open edge 35B. The first side 33A faces away from the floor 16 of the vehicle 10 and the second side 33B faces toward the floor 16 of the vehicle 10, as shown in FIG. 6. The open edge 35B includes an opening 37. The first side 33A, the second side 33B, the three closed edges 35A, and the open edge 35B define a pocket 34 therebetween. The pocket 34 is accessible via the opening 37. The cargo securing device 30 is in a tonneau cover position 52 whereby the third panel 24C of the tonneau cover 22 enters the pocket 34 through the opening 37 and the cargo securing device 30 thereby surrounds a portion of the third panel 24C situated within the pocket 34.

The four retaining members 40 are coupled to the second side 33B. The four retaining members 40 are located proximate to the opposing closed edges 35A of the sleeve 32. A pair of the retaining members 40 are located proximate to the open edge 35B and another pair of the retaining members 40 are located proximate to a closed edge 35A opposing the open edge 35B. The four retaining members 40 depend from the second side 33B and are engaged with the two opposing frame rails 26 of the tonneau cover assembly 21. The four retaining members 40 comprise a fastening portion 42, a connecting portion 44, and a sleeve engagement portion 46. The fastening portion 42 is engaged with the frame rails 26 of the tonneau cover assembly 21. The connecting portion 44 is attached to the fastening portion 42 and extends between the fastening portion 42 and the sleeve engagement portion 46. The sleeve engagement portion 46 is formed of the connecting portion 44 folded over onto and fastened to itself to form a closed loop. The sleeve engagement portion 46 is looped onto the second side 33B. The four retaining members 40 can be pulled down and around an underside of the opposing frame rails 26 to cause the third panel 24C to clamp cargo 19 against a tailgate 18, as shown in FIG. 1.

FIG. 6 is a perspective view of a cargo securing device 30 inside of a cargo area 12 of a vehicle 10. The cargo securing device 30 is in a cargo area configuration 50, whereby the cargo securing device 30 depends from a sidewall 14 of a vehicle 10. The cargo area 12 is defined by two opposing sidewalls 14 as shown in FIG. 1, a floor 16, and a tailgate 18. The two opposing sidewalls 14 include anchors 28 located thereon.

The cargo securing device 30 comprises a sleeve 32 and four retaining members 40, as shown in FIG. 2A and FIG. 2B. The sleeve 32 comprises a pocket 34 defined by a first side 33A, a second side 33B, three closed edges 35A, and an open edge 35B, as shown in FIG. 2A and FIG. 2B. The two opposing closed edges 35A are proximate to the sidewalls 14 of the vehicle 10 and one of the closed edges 35A, which opposes the open edge 35B, is proximate to the floor 16 of the vehicle 10. The retaining members 40 are engaged with the anchors 28, and support the cargo securing device 30. The sleeve 32 comprises an opening 37 at the open edge 35B through which the pocket 34 is accessible to store or remove cargo.

The present disclosure provides for a method of securing cargo. It is understood that any of the method steps can be performed in virtually any order. Moreover, one or more of the following method steps can be combined with other steps; can be omitted or eliminated; can be repeated; and/or can separated into individual or additional steps.

The method may include orienting a cargo securing device into a tonneau cover configuration. The method may include locating a cargo securing device onto one or more panels of a tonneau cover. The method may include placing the one or more retaining members of a cargo securing device into engagement with one or more frame rails of a tonneau cover assembly. Alternatively or additionally, the one or more retaining members may be placed into engagement with a floor of the vehicle, one or more sidewalls of the vehicle, a front wall of the vehicle, a tailgate of the vehicle, one or more anchors of the vehicle, a vehicle hitch, a vehicle frame, a vehicle bumper, or any combination thereof. The method may include adjusting a length of a connecting portion of one or more retaining members. The method may include adjusting a position of one or more retaining members on a sleeve. The method may include fastening cargo to the cargo securing device. The method may include clamping cargo against one or more structures of a cargo area.

The method may include orienting a cargo securing device into a cargo area configuration. The method may include locating a cargo securing device within a cargo area. As referred to herein, within a cargo area means within the confines of one or more structures of a cargo area. The cargo securing device may be located between a floor and an opening of a cargo area, between two opposing sidewalls of a cargo area, between a front wall and a tailgate of a cargo area, or any combination thereof. The method may include placing the one or more retaining members of a cargo securing device into engagement with a floor of the vehicle, one or more sidewalls of the vehicle, a front wall of the vehicle, a tailgate of the vehicle, one or more anchors of the vehicle, a vehicle hitch, a vehicle frame, a vehicle bumper, one or more frame rails, one or more panels of a tonneau cover, or any combination thereof. The method may include adjusting a length of a connecting portion of one or more retaining members. The method may include adjusting a position of one or more retaining members on a sleeve. The method may include locating cargo within a pocket of the cargo securing device.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms.

These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

REFERENCE NUMERALS

10 Vehicle
12 Cargo area
14 Sidewall
16 Floor
18 Tailgate
19 Cargo
20 Tonneau cover system
21 Tonneau cover assembly
22 Tonneau cover
24A First panel
24B Second panel
24C Third panel
26 Frame rail
27 Gap
28 Anchor
30 Cargo securing device
32 Sleeve
33A First side
33B Second side
34 Pocket
35A Closed edge
35B Open edge
36A Peripheral member
36B Transverse member
37 Opening
38 Shroud
40 Retaining member
42 Fastening portion
44 Connecting portion
46 Sleeve engagement portion
47 Handle
48 Hook
50 Cargo area configuration
52 Tonneau cover configuration
60 Longitudinal axis
62 Lateral axis
64 Perpendicular axis

What is claimed is:

1. A cargo securing device comprising:
a sleeve including an opening;
wherein the sleeve is configured to slide onto a rear panel of a tonneau cover so that the sleeve surrounds at least a portion of the rear panel, wherein the opening is sized to accommodate only the rear panel.

2. The cargo securing device according to claim 1, wherein the cargo securing device includes:
one or more peripheral members situated on one or more edges of the sleeve; and/or
one or more transverse members extending between two or more of the edges of the sleeve, wrapped around two or more of the edges of the sleeve, or both; and
wherein the one or more transverse members are situated on a first side of the sleeve, a second side of the sleeve, or both.

3. The cargo securing device according to claim 2, wherein the sleeve includes one or more shrouds extending between two or more of the edges; and wherein the one or more shrouds are situated on the first side of the sleeve, the second side of the sleeve, wrapped around two or more of the edges of the sleeve, or any combination thereof.

4. The cargo securing device according to claim 3, wherein the one or more shrouds are fabricated from a net, a fabric, a rigid panel, or any combination thereof.

5. The cargo securing device according to claim 2, wherein the opening is located on an edge of the sleeve that is free of the one or more peripheral members.

6. The cargo securing device according to claim 2, wherein a transverse member abuts the opening.

7. The cargo securing device according to claim 1, wherein the cargo securing device includes at least one retaining member coupled to the sleeve; and wherein the at least one retaining member is removably engageable with a frame rail installed on a cargo area, the cargo area, or both.

8. The cargo securing device according to claim 7, wherein the at least one retaining member includes a hook, a clip, a tie, a loop, or any combination thereof, which selectively engages the frame rail, the cargo area, or both.

9. A tonneau cover system comprising:
a tonneau cover assembly including:
a tonneau cover comprising one or more panels, and
a frame rail supporting the tonneau cover on a cargo area of a vehicle; and
a cargo securing device including:
a sleeve including an opening;
wherein the sleeve is configured to slide onto a rear panel of the tonneau cover so that the sleeve surrounds at least a portion of the rear panel, wherein the opening is sized to accommodate only the rear panel.

10. The tonneau cover system according to claim 9, wherein the cargo securing device includes:
one or more peripheral members situated on one or more edges of the sleeve; and/or
one or more transverse members extending between two or more of the edges of the sleeve, wrapped around two or more of the edges of the sleeve, or both; and
wherein the one or more transverse members are situated on a first side of the sleeve, a second side of the sleeve, or both.

11. The tonneau cover system according to claim 10, wherein the sleeve includes one or more shrouds extending between two or more of the edges; and wherein the one or more shrouds are situated on the first side of the sleeve, the second side of the sleeve, wrapped around two or more of the edges of the sleeve, or any combination thereof.

12. The tonneau cover system according to claim 11, wherein the one or more shrouds are fabricated from a net, a fabric, a rigid panel, or any combination thereof.

13. The tonneau cover system according to claim 9, wherein the cargo securing device includes at least one retaining member coupled to the sleeve; and wherein the at least one retaining member is removably engageable with the frame rail, the cargo area, or both.

14. The tonneau cover system according to claim 13, wherein the cargo securing device is selectively positionable in a cargo area configuration, a tonneau cover configuration, or both;
  wherein in the cargo area configuration, the sleeve hangs from the cargo area and the at least one retaining member engages the cargo area; and
  wherein in the tonneau cover configuration, the sleeve envelopes at least the rear panel of the tonneau cover, the at least one retaining member engages the frame rail of the tonneau cover assembly, or both.

15. The tonneau cover system according to claim 13, wherein the at least one retaining member includes a hook, a clip, a tie, a loop, or any combination thereof, which selectively engages the frame rail, the cargo area, or both.

16. The tonneau cover system according to claim 9, wherein the tonneau cover is foldable and unfoldable with the sleeve slid onto the rear panel.

17. A method of securing cargo comprising:
  sliding a cargo securing device onto at least a rear panel of a tonneau cover, the cargo securing device including one or more retaining members; and
  placing the one or more retaining members into engagement with one or more frame rails, the one or more frame rails being installed on a vehicle;
  wherein the cargo securing device includes a sleeve, which surrounds at least a portion of the panel, and an opening through which the panel enters the sleeve.

18. The method according to claim 17, wherein the one or more retaining members are placed into engagement with a floor of the vehicle, one or more sidewalls of the vehicle, a front wall of the vehicle, a tailgate of the vehicle, one or more anchors of the vehicle, a vehicle hitch, a vehicle frame, a vehicle bumper, or any combination thereof.

\* \* \* \* \*